United States Patent

Hirose et al.

[11] Patent Number: 4,773,753
[45] Date of Patent: Sep. 27, 1988

[54] FIBER SENSOR

[75] Inventors: Takao Hirose, Tochigi; Yoshiyasu Matsumura, Sendai, both of Japan

[73] Assignee: Daiichi Denshi Kogyo Kabushiki Kaisha, Tokyo, Japan

[21] Appl. No.: 900,506

[22] Filed: Aug. 26, 1986

[30] Foreign Application Priority Data

Sep. 3, 1985 [JP] Japan .................................. 60-194638
Sep. 3, 1985 [JP] Japan .................................. 60-194639

[51] Int. Cl.⁴ ............................................. G01B 9/02
[52] U.S. Cl. ................................. 356/35.5; 356/345; 356/351
[58] Field of Search ............ 356/345, 351, 358, 35.5; 250/227; 350/96.29, 96.30

[56] References Cited

U.S. PATENT DOCUMENTS 4,495,411 1/1985 Rashleigh ............................ 250/227
4,564,289 1/1986 Spillman, Jr. ....................... 356/33
4,638,153 1/1987 Dakin ................................ 356/351 X

FOREIGN PATENT DOCUMENTS 0129972 1/1985 European Pat. Off. .
61-47513 3/1986 Japan .

OTHER PUBLICATIONS

Langeac, "Temperature Sensing in Twisted Single-Mode Fibres", *Electronics Letters*, vol. 18, No. 24, pp. 1022–1023, 11/82.
Electronics Letters, vol. 20, No. 1, Jan. 1984, pp. 51–53, London, GB: J. P. Dakin et al: "Compensated Polarimetric Sensor Using Polarisation-Maintaining Fibre in a Differential Configuration".

Primary Examiner—Davis L. Willis
Assistant Examiner—Matthew W. Koren
Attorney, Agent, or Firm—Silverman, Cass, Singer & Winburn, Ltd.

[57] ABSTRACT

A fiber sensor for measuring temperature or strain comprises a first polarization-maintaining fiber and a second polarization-maintaining fiber. In case of a temperature fiber sensor, the first and second fibers are selected to be unequal in change in phase difference caused by change in temperature but equal in change in phase difference caused by strain. In case of a strain fiber sensor, the first and second fibers are selected to be unequal in change in phase difference caused by strain but equal in change in phase difference caused by change in temperature. Axes of polarization of the first and second fibers are shifted by 90° at a junction of the fibers. With this arrangement, the temperature fiber sensor can measure the change in temperature with high accuracy without being affected by strain, while the strain fiber sensor can measure the strain with high accuracy without being affected by the change in temperature.

3 Claims, 1 Drawing Sheet

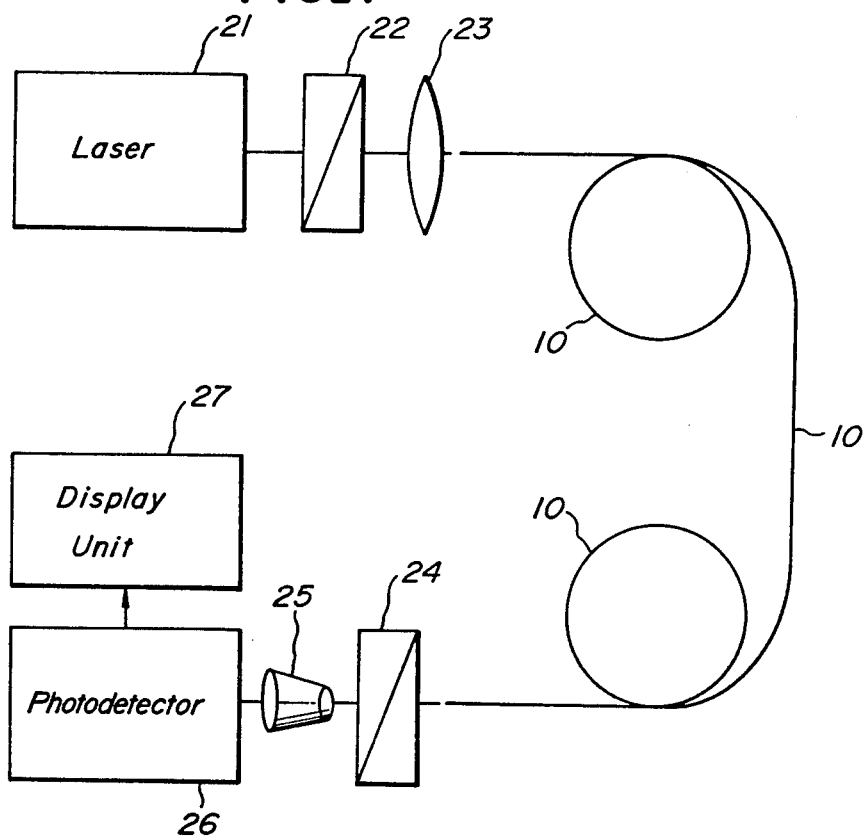
FIG_1 PRIOR ART
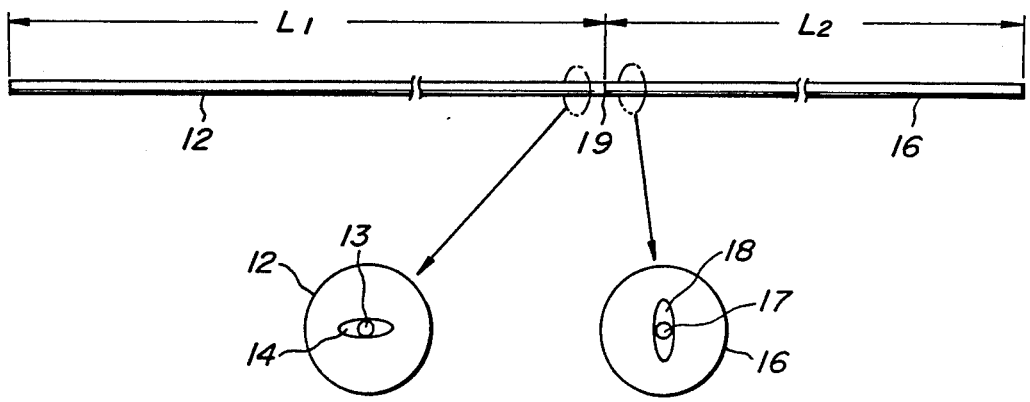
FIG_2

FIBER SENSOR

BACKGROUND OF THE INVENTION

This invention relates to a fiber sensor for measuring external factors such as strain, temperature or the like utilizing optical fibers, and more particularly to a fiber sensor for measuring strain or temperature by transmitting laser beams through polarization-maintaining fibers.

A strain or temperature sensor using polarization-maintaining fibers has been already developed. However, it has been found that such a temperature sensor is greatly affected by strain, while a strain sensor is affected by temperature. One example of such a sensor using polarization-maintaining fibers (for example, document No. 2F17 distributed in combination seminar of Tohoku district branches of societies concerning electricity, 1984) will be explained referring to FIG. 1.

The term "polarization-maintaining fiber" used in the specification and claims is to be understood to mean a fiber manufactured in a manner that one of two orthogonal polarization modes is unable to propagate light beams or propagation constants of the two orthogonal polarization modes are much different in order to make very small the transference of energy from one mode to the other. It may be also generally referred to as "single-polarization single-mode fiber".

In FIG. 10, reference numeral 10 denotes a polarization-maintaining fiber for use in a temperature sensor or a strain sensor. These temperature and strain sensors are substantially the same as in construction so long as FIG. 1 illustrates. The sensor comprises a laser 21 such as gas or semiconductor laser, a polarizer 22 for polarizing output beams from the laser 21 at a plane of polarization at 45° (orthogonal components 1:1), a lens 23 for admitting the beams passed through the polarizer 22 into the fiber 10, an analyzer 24 for acting upon the beams from the fiber 10, a collimator 25 for collecting the beams from the analyzer 24, a photodetector 26 such as photomultiplier, photodiode and avalanche photodiode for detecting the intensity of the beams from the collimator 25, and a display unit 27 such as Brawn tube display or recorder for displaying the output of the photodetector 26.

It is considered that X and Y components of polarized light beams to be admitted into the polarizationmaintaining fibers through the polarizer 22 are equal. Owing to change in temperature (in case of the temperature sensor) or strain or tensile force in an axial direction of the polarization-maintaining fibers (in case of the strain sensor), the X and Y components of the polarized light beams pass through the polarization-maintaining fiber in different time (delay time). In other words, the time required for passing through the fibers is different for the X and Y components. Namely, the shift or difference in phase between the X and Y components of the polarized light beams at the exit end of the polarization-maintaining fiber 10 is changed so that the polarization of the resultant beams of the X and Y components changes from linear polarization to circular and elliptical polarizations. Such changes are detected by the photodetector 26 through the analyzer 24 as the change in intensity of light beams. The change in intensity is displayed in the display unit 27.

In this case, with the temperature sensor, the change in rotative angle of the polarization at the exit end of the polarization-maintaining fiber 10 is not brought about only by the change in temperature. It is also brought about by strain or tensile force in the axial direction of the polarization-maintaining fiber 10.

In the same manner, with the strain sensor, the change in rotative angle of the polarization at the exit end of the polarization-maintaining fiber 10 is not brought about only by strain or tensile force in the axial direction of the polarization-maintaining fiber 10. It is also brought about by the change in temperature. Both the effects could not be separated.

In general, on the other hand, the change in temperature causes the polarization-maintaining fiber 10 itself to expand or contract. Moreover, if there is a protective coating for the fiber 10, it would be subjected to strains of expansion or contraction of the protective coating. Accordingly, the rotation of the polarization at the exit end of the fiber 10 results in detection of changes in temperature and strain simultaneously, so that the sole temperature or strain could not be exactly measured.

Moreover, the temperature sensor or strain sensor using fibers is often used under bad circumstances. Under such conditions, the sensor would be further subjected to extra strains such as vibrations and undue change in temperature, so that the accuracy of measurement of temperature or strain further lowers.

SUMMARY OF THE INVENTION

It is a primary object of the invention to provide a fiber sensor which eliminates all the disadvantages of the prior art and can measure temperature without being affected by strain or can measure strain without being affected by temperature.

In order to achieve this object, a fiber sensor for measuring an external factor such as temperature and strain according to the invention comprises a first polarization-maintaining fiber and a second polarization-maintaining fiber, said first and second fibers being unequal to each other in change in phase difference between X and Y components of polarization, said change in phase difference being caused by said external factor to be measured, and said first and second fibers being equal to each other in change in phase difference between the X and Y components of the polarization, said change in phase difference being caused by an external factor other than the external factor to be measured, axes of polarization of the first and second fibers being shifted by 90° at a junction of these fibers whose axes are coincident with each other.

In a preferred embodiment of the invention, the external factor to be measured is change in temperature and the external factor other than that to be measured is strain.

In another embodiment of the invention, the external factor to be measured is strain and the external factor other than that to be measured is change in temperature.

According to the invention, two polarization-maintaining fibers are selected to be unequal in characteristics concerning a factor to be measured and equal in characteristics concerning a factor other than the factor to be measured and connected in a manner shifting axes of polarization by 90°. When the light beams are introduced into the fibers, the effects of the first and second fibers on the phase difference of the X and Y components act in opposite polarity. In other words, the plane of polarization is rotated in the clockwise direction by the first fiber and in the counterclockwise direction by the second fiber, so that the rotative angles caused by the factor other than the factor to be measured are canceled.

With this arrangement, the rotation of polarization caused by the factor other than the factor to be measured is canceled and only the rotation caused by the factor to be measured is obtained, so that measurement of temperature or strain can be effected with high accuracy.

The invention will be more fully understood by referring to the following detailed specification and claims taken in connection with the appended drawings.

BRIEF DESCRIPTION OF THE DRAWINGS

FIG. 1 illustrates an arrangement of a fiber sensor of the prior art; and

FIG. 2 illustrates one example of a fiber sensor according to the invention.

DESCRIPTION OF THE PREFERRED EMBODIMENTS

First, a temperature fiber sensor according to the invention wil be explained by referring to FIG. 2.

A polarization-maintaining fiber (first fiber) 12 having a length $L_1$ and a polarization-maintaining fiber (second fiber) 16 having a length $L_2$ are connected by welding or by the use of a connector. Each of the first and second fibers 12 and 16 has a diameter of 125 $\mu m$ and includes a core 13 or 17 having a diameter of 4 $\mu m$ and an elliptical clad 14 or 18 surrounding the core. These fibers are connected to each other in a manner crossing major axes of the elliptical clads 14 and 18 at right angles in order to shift their polarization axes at 90°. When polarized beams pass through the polarization-maintaining fibers, the change in temperature and the strain affect the delay time in a different manner between X and Y components. Therefore, phase difference between the X and Y components is caused as the polarized beams are passing through the polarization-maintaining fibers, so that the polarization of the resultant beams of the X and Y components is rotated. The rotation of the polarization resulting from the phase difference is detected as intensity of light beam by a photodetector (such as shown by the reference numeral 26 in FIG. 1) after passing through an analyzer (such as shown by the numeral 24 in FIG. 1).

In this case, the first and second fibers are made of different materials, so that the effect of the change in temperature and strain (tensile force in axial directions of the first and second fibers 12 and 16) on the change in phase difference is different between the first and second fibers.

It is assumed as to the first fiber 12 that the change in phase difference of the first fiber is $\Delta\phi_1$, temperature coefficient for the change in temperature acting upon the phase difference is $A_1$, strain coefficient is $B_1$, and change in length of the first fiber 12 due to strain is $\Delta L_1$. It is also assumed as to the second fiber 16 that the corresponding values to the above are $\Delta\phi_2$, $A_2$, $B_2$ and $\Delta L_2$, respectively.

Now, when the change in temperature is assumed as $\Delta T$, the following equations are obtained, $$\Delta\phi_1 = A_1 L_1 \Delta T + B_1 \Delta L_1 \tag{1}$$

$$\Delta\phi_2 = A_2 L_2 \Delta T + B_2 \Delta L_2 \tag{2}$$

In this case, the first and second fibers are selected so as to achieve the equation (3).

$$B_1 \Delta L_1 = B_2 \Delta L_2 \tag{3}$$

In other words, the first and second fibers 12 and 16 are selected so as to make equal the changes in phase difference between the first and second fibers caused by strains.

In this manner, the change in phase difference $\Delta\phi$ between the X and Y components which have passed the first and second fibers 12 and 16 in series is indicated as the following equation (4), because axes of the polarization of the first and second fibers 12 and 16 are shifted by 90°.

$$\Delta\phi = \Delta\phi_1 - \Delta\phi_2 \tag{4}$$

Accordingly, the following equation (5) is obtained from the equations (1)-(4).

$$\Delta\phi = (A_1 L_1 - A_2 L_2)\Delta T \tag{5}$$

As is clearly evident from the equation (5), the change in phase difference $\Delta\phi$ is not affected by strain but exclusively affected by the change in temperature $\Delta T$.

As can be seen from the above description, only the change in temperature can be measured with high accuracy without being affected by strains by the fiber sensor comprising two polarization-maintaining fibers connected in series having the characteristics shown in FIG. 2 and explained by the use of the equations (1)-(5) instead of the polarization-maintaining fiber hitherto used as a temperature sensor shown in FIG. 1.

Next, a strain fiber sensor according to the invention will be explained by referring to FIG. 2 again.

In the same consideration as in the first embodiment, the equations (1) and (2) are introduced.

$$\Delta\phi_1 = A_1 L_1 \Delta T + B_1 \Delta L_1 \tag{1}$$

$$\Delta\phi_2 = A_2 L_2 \Delta T + B_2 \Delta L_2 \tag{2}$$

In this case, the first and second fibers are selected so as to achieve the equation (6).

$$A_1 L_1 = A_2 L_2 \tag{6}$$

In other words, the first and second fibers 12 and 16 are selected so as to make equal the changes in phase difference between the first and second fibers caused by the difference in temperature.

In this manner, the change in phase difference $\Delta\phi$ between the X and Y components which have passed the first and second fibers 12 and 16 in series is indicated as the following equation (7), because axes of the polarization of the first and second fibers 12 and 16 are shifted by 90°.

$$\Delta\phi = \Delta\phi_1 - \Delta\phi_2 \tag{7}$$

Accordingly, the following equation (8) is obtained from the equations (1), (2), (6) and (7).

$$\Delta\phi = B_1 \Delta L_1 - B_2 \Delta L_2 \tag{8}$$

As is clearly evident from the equation (8), the change in phase difference $\Delta\phi$ is not affected by the change in temperature but exclusively affected by the strain.

As can be seen from the above description, only the strain can be measured with high accuracy without being affected by the change in temperature by the fiber sensor comprising two polarization-maintaining fibers connected in series having the characteristics shown in FIG. 2 and explained by the use of the equations (1), (2), (6), (7) and (8) instead of the polarizationmaintaining fiber hitherto used as a strain sensor shown in FIG. 1.

Although the polarization-maintaining fibers having elliptical clads have been explained by way of example referring to FIG. 2, it is clearly evident from the above description to obtain the similar effect with other kinds of polarization-maintaining fibers such as those having oval shaped clads.

As can be seen from the above explanation, the present invention can provide an improved fiber sensor which can measure with high accuracy the change in temperature without being affected by the strain or can measure the strain without being affected by the change in temperature and which is suitable for use in bad environmental conditions causing vibrations and excess change in temperature.

While the invention has been particularly shown and described with reference to preferred embodiments thereof, it will be understood by those skilled in the art that the foregoing and other changes in form and details can be made therein without departing from the spirit and scope of the invention.

What is claimed is:

1. A fiber sensor for measuring an external factor from the group consisting of temperature and strain. comprising a first polarization-maintaining fiber and a second polarization-maintaining fiber, said first and second fibers being unequal to each other in change in phase difference between X and Y components of polarization, said change in phase difference being caused by said external factor to be measured, and such first and second fibers being equal to each other in change in phase difference between the X and Y components of the polarization, said change in phase difference being caused by an external factor other than the external factor to be measured, axes of polarization of the first and second fibers being shifted by 90° at a junction of these fibers whose axes are coincident with each other.

2. A fiber sensor as set forth in claim 1, wherein said external factor to be measured is change in temperature and said external factor other than that to be measured is strain.

3. A fiber sensor as set forth in claim 1, wherein said external factor to be measured is strain and said external factor other than that to be measured is change in temperature

* * * * *